(12) United States Patent
Juravic et al.

(10) Patent No.: US 8,679,560 B2
(45) Date of Patent: Mar. 25, 2014

(54) APPARATUS, SYSTEMS AND METHODS FOR MANUFACTURING FOOD PRODUCTS

(75) Inventors: Davor Juravic, San Pedro, CA (US); Yomayra Alvarez, Long Beach, CA (US); Oscar Ortiz, Hawthorne, CA (US); Dwayne P. McDowell, II, San Pedro, CA (US); Geoffrey Chase Thornhill, San Francisco, CA (US)

(73) Assignee: Del Monte Corporation, San Francisco, CA (US)

( * ) Notice: Subject to any disclaimer, the term of this patent is extended or adjusted under 35 U.S.C. 154(b) by 156 days.

(21) Appl. No.: 13/036,795

(22) Filed: Feb. 28, 2011

(65) Prior Publication Data
US 2012/0219676 A1 Aug. 30, 2012

(51) Int. Cl.
*A23L 1/317* (2006.01)

(52) U.S. Cl.
USPC ........... 426/465; 426/634; 426/646; 426/513; 426/516; 426/520; 426/802; 426/805; 241/13.24; 241/26; 241/97; 83/35; 83/36; 83/39; 83/404.2; 83/704; 83/932

(58) Field of Classification Search
USPC ......... 426/646, 634, 512, 513, 516–519, 802, 426/805, 465, 520; 241/24.26, 97, 13; 83/35, 36, 39, 249, 404.1, 404.2, 703, 83/704, 932, 213, 214
See application file for complete search history.

(56) References Cited

U.S. PATENT DOCUMENTS

| | | | | |
|---|---|---|---|---|
| 2,203,318 A | * | 6/1940 | Yerk | 426/388 |
| 2,771,366 A | * | 11/1956 | Shadid | 426/388 |
| 3,478,794 A | * | 11/1969 | Alpen | 99/637 |
| 3,916,741 A | * | 11/1975 | Comstock et al. | 83/27 |
| 3,990,336 A | * | 11/1976 | Soodalter | 83/404.2 |
| 4,112,545 A | * | 9/1978 | Covington et al. | 426/646 |
| 4,158,065 A | * | 6/1979 | Sugino | 426/104 |
| 4,239,785 A | | 12/1980 | Roth | |
| 4,303,682 A | | 12/1981 | Guitteny | |
| 4,358,468 A | | 11/1982 | Dolan | |
| 4,614,489 A | * | 9/1986 | Juravic | 425/376.1 |
| 4,800,094 A | | 1/1989 | Freda | |
| 4,868,002 A | * | 9/1989 | Scaglione et al. | 426/641 |
| 5,026,572 A | | 6/1991 | Neiberger | |
| 5,037,350 A | * | 8/1991 | Richardson et al. | 452/174 |
| 5,290,584 A | | 3/1994 | Ray | |

(Continued)

*Primary Examiner* — Drew E Becker
(74) *Attorney, Agent, or Firm* — Dilworth Paxson LLP

(57) ABSTRACT

Apparatus, systems and methods are disclosed to manufacture a plurality of edible pieces in a continuous process where each piece is generally different in thickness, shape, size and/or texture from another piece, so as to create, in the aggregate product distribution, pieces of randomly varying thickness, size, shape and/or texture. More specifically, the present invention, in its various embodiments, provides a process for manufacturing pet jerky treats comprising: grinding proteinaceous material, mixing said proteinaceous material with preservatives and flavor enhancers to form a blend of foodstuff, extruding said foodstuff through at least one die opening that is at least partially irregular to form at least one strip of extrudate that is at least partly irregular in shape, transporting said strip in a first longitudinal direction to a first cutting operation, cutting said strip at a first cutting angle to form a first set of pieces, transporting said first set of pieces in a second longitudinal direction to a second cutting operation, cutting said first set of pieces in said second cutting operation at a second angle to form a second set of pieces, such that the said second set of pieces cumulatively produced during a process run generally appear to be of random sizes and shapes.

17 Claims, 12 Drawing Sheets

(56) References Cited

U.S. PATENT DOCUMENTS

| | | | |
|---|---|---|---|
| 5,425,307 A * | 6/1995 | Rush et al. .................... 99/357 |
| 5,731,029 A | 3/1998 | Karwowski |
| 5,773,070 A | 6/1998 | Kazemzadeh |
| 6,017,570 A * | 1/2000 | Gagliardi, Jr. ............... 426/513 |
| 6,238,726 B1 | 5/2001 | Fischer |
| 6,485,770 B2 | 11/2002 | McIsaac |
| 6,764,295 B2 * | 7/2004 | Jensen et al. ................ 425/316 |
| 7,087,260 B2 | 8/2006 | Axelrod |
| 7,258,050 B2 * | 8/2007 | Griffith ............................ 83/49 |
| 7,282,235 B2 | 10/2007 | Lombard |
| 2005/0048189 A1 | 3/2005 | Lombard |
| 2008/0020117 A1 | 1/2008 | Lombard |
| 2008/0185746 A1 | 8/2008 | Axelrod |
| 2009/0004357 A1 * | 1/2009 | McCormick et al. ......... 426/582 |
| 2009/0274800 A1 * | 11/2009 | Assenmacher et al. ....... 426/129 |
| 2009/0311390 A1 | 12/2009 | Phelps |

\* cited by examiner

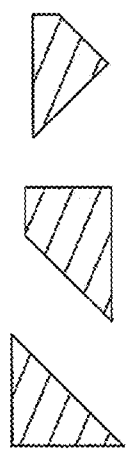
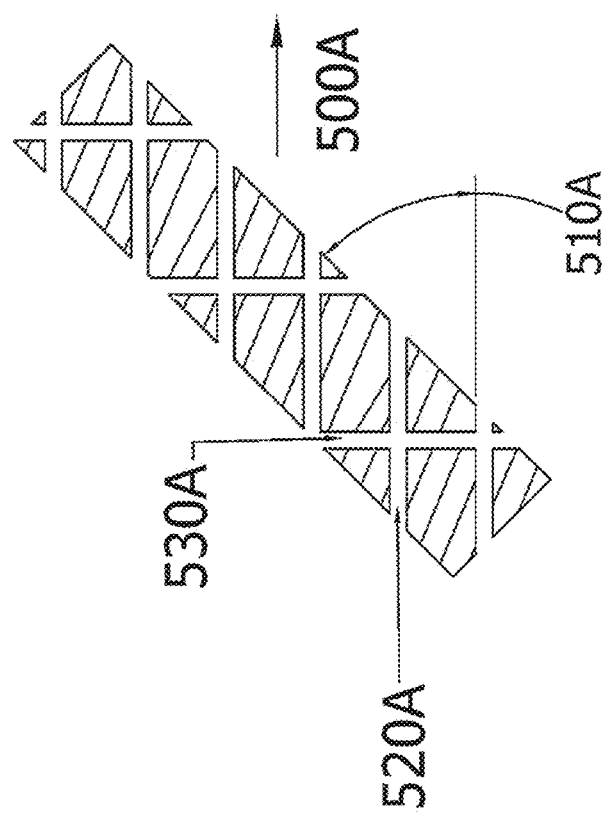
FIG. 5B
FIG. 5A

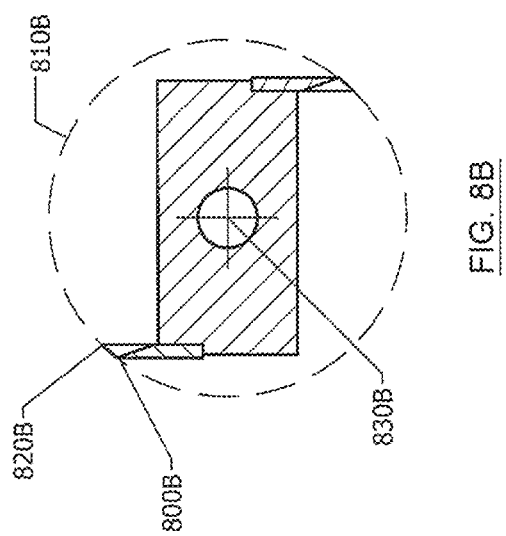
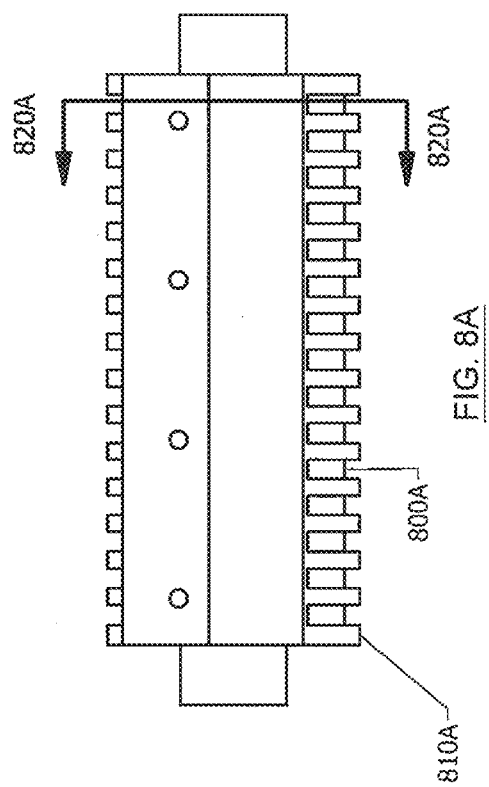
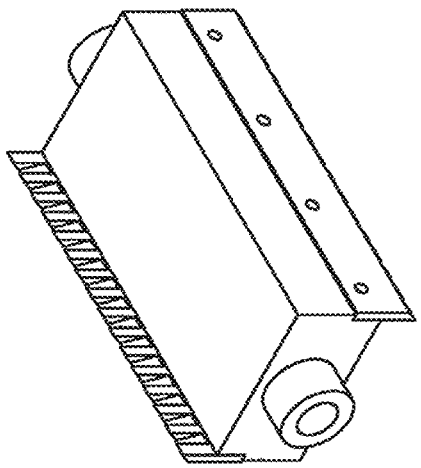

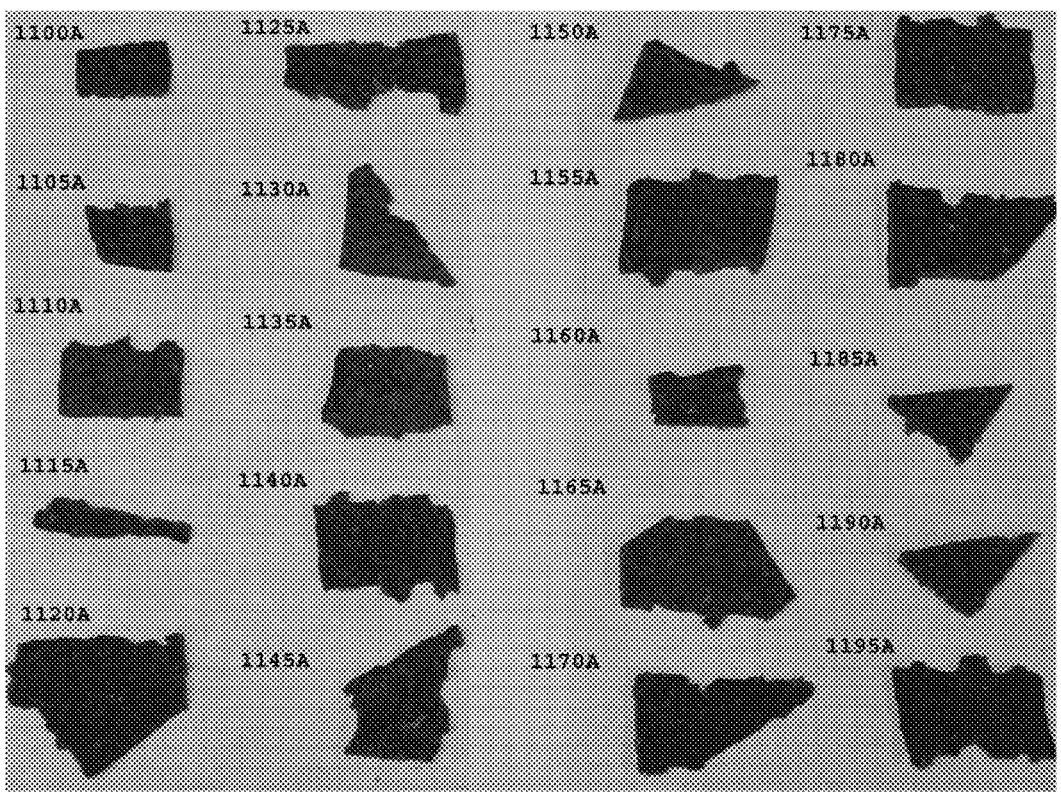
FIG. 11A: Photograph of 20 Beef Jerky Treats from Package

FIG. 11B: Product Distribution in a Package of 20 Jerky Treats
(Dimensions in Inches)

| Piece No. | FIG. 11A ID NO. | Closest Shape | LENGTH** | WIDTH** | THICKNESS** | |
|---|---|---|---|---|---|---|
| | | | | | GREATEST | SMALLEST |
| 1 | 1100A | RECTANGLE | 1.266 | 0.7 | 0.286 | 0.22 |
| 2 | 1105A | TRAPEZOID | 1.1 | 0.8 | 0.28 | 0.28 |
| 3 | 1110A | RECTANGLE | 1.6 | 1.07 | 0.27 | 0.18 |
| 4 | 1115A | RECTANGLE | 2.02 | 0.375 | 0.32 | 0.23 |
| 5 | 1120A | TRAPEZOID | 2.25 | 1.82 | 0.27 | 0.19 |
| 6 | 1125A | RECTANGLE | 2.4 | 1.15 | 0.23 | 0.13 |
| 7 | 1130A | TRIANGLE | 2.05 | 1.15 | 0.27 | 0.19 |
| 8 | 1135A | RECTANGLE | 1.7 | 1.25 | 0.27 | 0.19 |
| 9 | 1140A | PARALLELOGRAM | 1.8 | 1.4 | 0.32 | 0.16 |
| 10 | 1145A | TRIANGLE | 2.1 | 1.43 | 0.26 | 0.16 |
| 11 | 1150A | TRIANGLE | 2.1 | 1 | 0.41 | 0.41 |
| 12 | 1155A | PARALLELOGRAM | 2 | 1.375 | 0.32 | 0.19 |
| 13 | 1160A | RECTANGLE | 1.26 | 0.7 | 0.29 | 0.29 |
| 14 | 1165A | TRAPEZOID | 1.2 | 1.3 | 0.27 | 0.23 |
| 15 | 1170A | TRAPEZOID | 2.26 | 1.23 | 0.27 | 0.27 |
| 16 | 1175A | RECTANGLE | 2.26 | 1.23 | 0.29 | 0.29 |
| 17 | 1180A | TRAPEZOID | 1.93 | 1.27 | 0.33 | 0.19 |
| 18 | 1185A | TRIANGLE | 2.3 | 1.27 | 0.26 | 0.18 |
| 19 | 1190A | TRIANGLE | 1.65 | 0.96 | 0.18 | 0.18 |
| 20 | 1195A | PARALLELOGRAM | 2 | 1.36 | 0.3 | 0.18 |

** *Approximate nominal dimensions of irregular pieces of FIG. 11A.*

APPARATUS, SYSTEMS AND METHODS FOR MANUFACTURING FOOD PRODUCTS

FIELD OF THE INVENTION

The present invention generally relates to apparatus, systems and methods for manufacturing food, more specifically jerky-styled pet food products, of variable thickness and texture, and in irregular, randomized shapes and sizes.

BACKGROUND OF THE INVENTION

A large and growing number of households have pets. Studies have shown that pet owners often treat their pets as they treat close friends and relatives. Owners include pets in holiday celebrations, and often refer to themselves as parents of their pets. Such affinity is tangibly demonstrated in the rapid growth of a multibillion dollar pet industry with an increasing demand for pet products that mimic human products.

Health conscious consumers are also demanding higher quality pet food that is not only closer in ingredient quality to human food, but also looks less processed and more natural. However, conventional pet food producers seldom focus on the visual impact of pet food that heightens aesthetic appeal to a purchaser, even if they integrate advanced ingredients more commonly found in food produced for human consumption. Since a traditional manufacturing goal is reproducibility and uniformity, industrial cutting machines used in these conventional pet food processes are primarily designed to deliver products with consistency in shape, texture and size. Therefore, pet food packages typically contain edible pieces, or kibbles, where each kibble is generally of uniform shape and size, often readily appearing glazed or processed. For example, pet jerky treats are made by extrusion through generally uniform die openings, producing strips or rods that are typically uniform in shape, and which are then typically cut in uniform pieces that are rectangular (flat) or cylindrical (rod) in appearance. Pet food resembling red meat marbled with fat has been made by extruding or pressure casting a blend of red meat and white fat, but the end product is again a plurality of food pieces of generally uniform shape and size.

Manufacturing techniques used to produce human food are often not cost effective for pet foods. For example, jerky-style products for human consumption are made from sliced premium muscle meat, and contain almost no grains, starch or carbohydrates. Because of the high concentration of muscle meat and fat, increased time is required for processing of human grade jerky, especially drying. The increased use of meat, lack of carbohydrates, and the slower drying process results in a final product that shrinks and forms into long strips of randomly wrinkled meat, in the distinct rugged appearance of natural jerky with which consumers are familiar, and often associate with higher quality.

While human grade jerky may certainly be used as pet food, it would be cost prohibitive for most pet owners. This is because human grade jerky is primarily marinated meat, often costly premium meat. When the product is almost 100% meat, it also becomes difficult to process efficiently in high volumes, thereby increasing processing time and costs. To reduce ingredient costs, pet jerky treats use lower amounts of meat (typically 20-40%), and usually do not use any premium muscle meat. To compensate for lower amounts of meat in pet jerky, 20-40% of flour or starches must be added, along with other ingredients such as vegetables, preservatives, and flavor enhancers. Besides lowering ingredient costs, the flour and starch significantly improve processing ability for high volume manufacturing, further reducing production times and costs.

Human grade jerky is usually designed for relatively short shelf lives. Pet food, on the other hand, is engineered to be stored (if necessary) for eighteen months after manufacturing before it is consumed, and therefore requires a substantially longer shelf life. Human grade jerky packets, once opened, become stale in less than a week. Pet jerky, however, is expected to last for up to three months after the package is opened. The delay in the storage and consumption of pet foods requires more careful ingredient selection, preservation of freshness with antioxidants, processing that avoids insects and rancidity, careful packaging and storage. This kind of food processing, with a higher mix of inexpensive ingredients, particularly carbohydrates, lends itself well to traditional extrusion techniques.

Since high moisture meat products tend to spoil quickly, such products are usually sold in cans in the pet food market, and are more typical as cat food. Pet food or kibble with low moisture content (typically less than 10%), are dry and hard, and less palatable to pets. Semi-moist pet food, typically having moisture content between 15 and 30%, is very popular with animals since it has a texture and palatability that is closest to meat. However, as discussed, semi-moist pet food is difficult to store in a stable condition, without canning or refrigeration, for long periods.

Thus, neither conventional pet food manufacturing processes nor traditional production techniques of jerky-style products for human consumption can meet the requirements of cost-effectively manufacturing jerky products for pets of variable thicknesses, texture, and non-uniform shapes and sizes that remain semi-moist, and shelf-stable without refrigeration for long periods under normal storage conditions. Furthermore, there is no conventional food processing method for either pet or human food that can produce a continuous line of jerky pieces that mimic the natural, irregular, wrinkled and rugged look and feel of human grade jerky produced traditionally.

SUMMARY OF THE INVENTION

Illustrative embodiments of the present invention include apparatus, systems and methods for manufacturing a plurality of edible pieces in a continuous process where each piece is generally different in thickness, shape, size and/or texture from another piece, so as to create, in the aggregate, product pieces of randomly varying thickness, size, shape and/or texture. More specifically, the various embodiments provide a method to manufacture a pet jerky treat that is not only of good nutritional quality, but also mimics the natural, wrinkled, rugged and random appearance and texture of jerky products that are designed for human consumption. While embodiments are described primarily with respect to pet food products and pet jerky products in particular, it should be appreciated that the disclosed apparatus, systems and methods may be applied to the cost-effective production of a broad range of food products, whether intended for pet or human consumption.

More specifically, one illustrative embodiment of the present invention provides a process for manufacturing pet jerky treats comprising: grinding proteinaceous material, mixing said proteinaceous material with preservatives and flavor enhancers to form a blend of foodstuff, extruding said foodstuff through at least one die opening that is at least partially irregular to form at least one strip of extrudate that is at least partly irregular in shape, transporting said strip in a first longitudinal direction to a first cutting operation, cutting said strip at a first cutting angle to form a first set of pieces, transporting said first set of pieces in a second longitudinal direction to a second cutting operation, cutting said first set of pieces in said second cutting operation at a second angle to form a second set of pieces, such that the said second set of pieces cumulatively produced during a process run generally appear to be of random sizes and shapes.

It will be appreciated by those skilled in the art that the foregoing brief description and the following detailed description are exemplary and explanatory only, and are not intended to be restrictive thereof or limiting the invention. Thus, the accompanying drawings, referred to herein and constituting a part hereof, illustrate only preferred embodiments of the invention, and, together with the detailed description, serve to explain the principles of the invention.

BRIEF DESCRIPTION OF THE DRAWINGS

FIGS. 5A and 5B shows possible shaping patterns of the jerky product after the cutting/shredding process of FIG. 4 and just before the packaging step (185) of FIG. 1, according to an illustrative embodiment of the invention.

FIGS. 8A, 8B and 8C show further details and different views of dual cut crosscut blades mounted to a crosscut spindle (740C of FIG. 7), according to an illustrative embodiment of the invention.

FIG. 11A shows a photograph of 20 beef jerky treats in generally random sizes, shapes and textures, which were made according to an embodiment of the invention.

FIG. 11B shows approximate nominal dimensions of the 20 irregular product treats shown in FIG. 11A.

DETAILED DESCRIPTION OF THE PREFERRED EMBODIMENT

Illustrative and alternative embodiments and operational details of apparatus, systems and methods to manufacture a plurality of irregular, random edible pieces of varying texture in a continuous process will be discussed in detail below with reference to the figures provided. One preferred product, however, is an edible food product for animal consumption, more particularly a pet treat or jerky containing meat or meat analogs.

Figure 1:
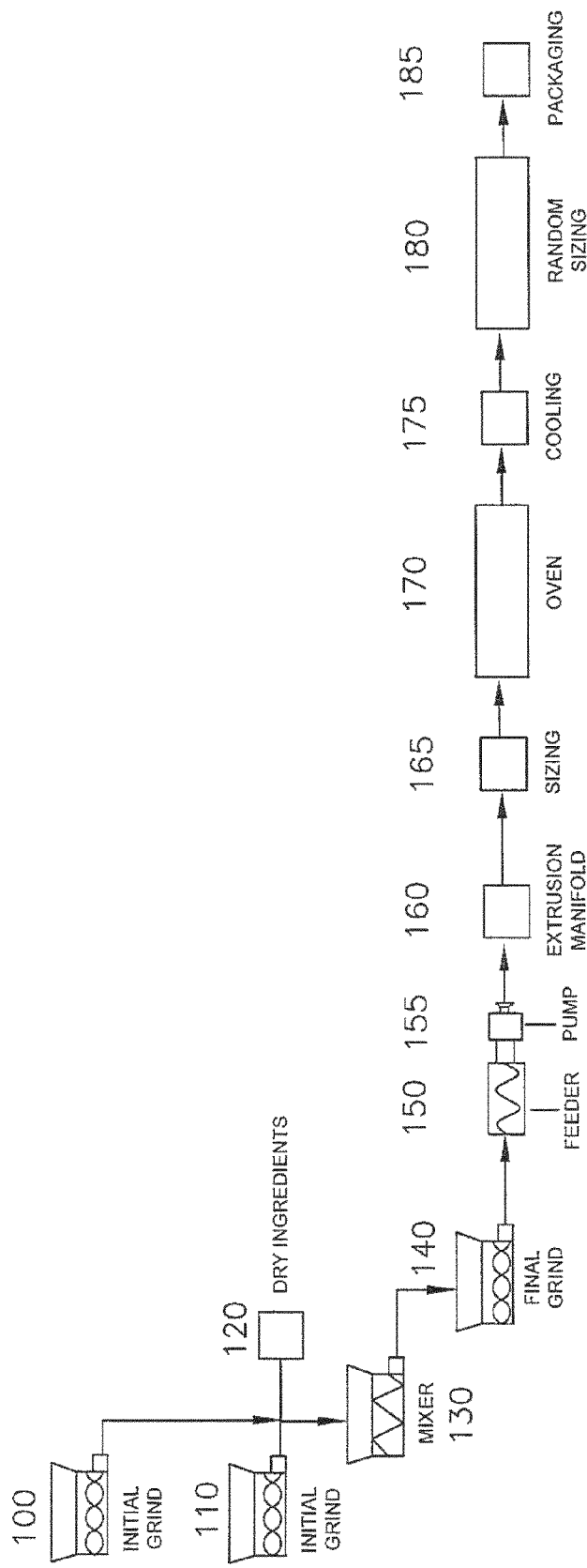
FIG. 1 is an overview of a process for making irregularly shaped jerky, according to an illustrative embodiment of the invention.

In one illustrative embodiment of the invention shown in FIG. 1, frozen blocks of premium muscle meat or any appropriate proteinaceous material are processed through a first grinder (100). This grinder has relatively large grinder plate openings (larger than ½×1½ inches in nominal diameter but no larger than 4×7 inches each), resulting in large chunks of meat with more longitudinal grains. A variety of geometrical and non-geometrical shapes can be used for the grinder plate openings (e.g., rectangular, trapezoid, teardrop, etc.) to add to the textural properties of the final product. Frozen blocks of pet grade meat are processed through a second grinder (110) with smaller grinder plate openings (larger than 1/16" diameter but smaller than 1" diameter). This dual grinding step and/or the use of premium muscle meat can also contribute to the appearance and texture of the final jerky product.

The ground meat is batched and mixed in a ribbon flight mixer (130), typically a ribbon flight mixer, sigma blade, solid screw or any similar mixing equipment common in food processing. Dry ingredients (120) are added to the meat batch in the mixer, and the details of the ingredients and proportions are described in TABLE 1, further below. The mixed batch is processed with a third grinder (140) that assists in the consistent mixing of both longitudinal grains and smaller chunks of meat in such a way that the resultant meat emulsion can be extruded easily. This additional grinding step can also contribute to the appearance and texture of the final jerky product. Note also that while the grinding and mixing steps described herein are a preferred embodiment, similar results can also be attained by separately sourcing pre-ground (and pre-mixed) proteins and other ingredients, and then using this externally sourced ground mix as the starting raw material to carry out the rest of the process steps described in FIG. 1 and below.

Figure 2B:
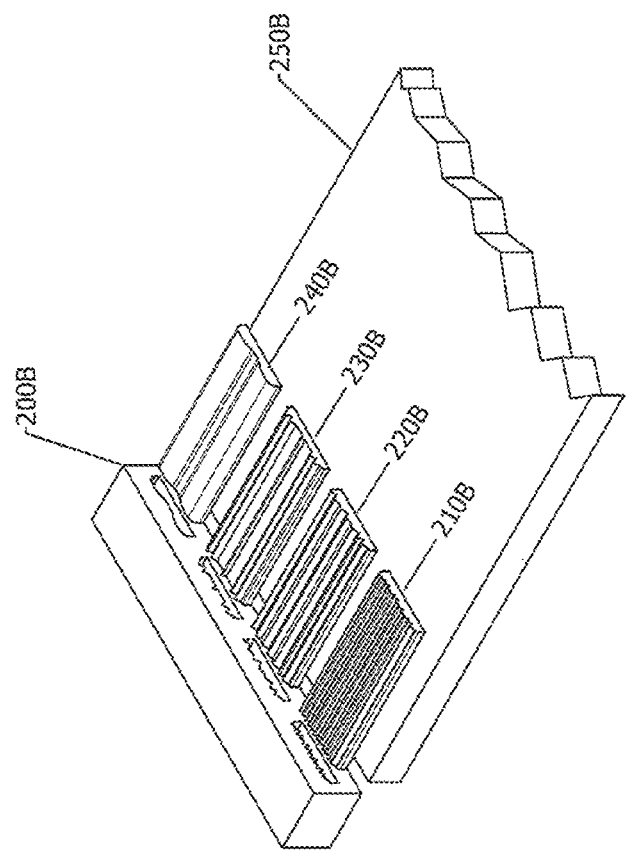
FIGS. 2A and 2B show details of the extrusion manifold (160) of the process of FIG. 1, according to an illustrative embodiment of the invention.

After the final grind (140), the meat emulsion is fed (150) to a positive displacement pump (155), from which it is conveyed to an extrusion manifold (160). Here, the product is extruded through an extrusion manifold having generally irregular die openings. Irregular as referred to herein, indicates that the die opening can be shaped in any combination of linear, non-linear, curved, geometric, symmetrical or non-symmetrical, uniform or non-uniform pattern that can vary across the nominal dimensions of the die opening. Further, part of the contour of the die opening can be regular and uniform whereas the rest of the contour is irregular, as for instance a rectangular slit where one of the sides of the rectangle is replaced by a wavy or non-linear pattern. For clarity, an illustrative embodiment of such an extrusion manifold is detailed in FIG. 2A (item 200A) and the corresponding isometric view in FIG. 2B (item 200B). The die openings and/or inner surfaces of the extrusion manifold (160, 200A, 200B) can have a variety of patterns of differing dimensions and shapes as illustrated in 210A, 220A, 230A or 240A. When the meat emulsion is extruded through this manifold, it produces extruded strips of varying thickness and shapes with a unique texture, as shown in FIG. 2B. For instance, the jerky strips can be extruded through a die containing several slots having various waved or ridged patterns, with a resulting interim product distribution having a range of surface contour patterns, from a smooth transitioned wave pattern (240B) to a more granular rippled surface (210B). Further, the bottom of one or more of the extrusion die openings (210A, 220A, 230A or 240A) can also be of varying or irregular shape. It must also be emphasized that, because of further downstream processing (described below), extrusion die openings of substantially regular and uniform linear patterns can also be used in this step of the process to achieve a similar end result, so long as at least one of the extruder die openings used in the process is at least slightly irregular, e.g., has a curved or non-linear contour.

In FIG. 2B, four strips (210B-240B), typically about 2½" wide, are extruded continuously, cut with any typical post-extrusion cutting process (water jets, pinching cleats, knife blades, etc.) onto 12"×48" long plastic trays (250B) transferred with a belt conveyor. Cleats are preferred. This step acts as an initial product sizing operation (165). Note, however, that the product could also be extruded directly onto a continuous belt conveyor. The number and size of the extrusion patterns and openings, whether they are of similar or different sizes, may vary, and is related to the width of the trays or belt used in the process. If trays are used, the extrudate (210B-240B) is cut to the length of the trays (250B) with the cleats, and the trays are then conveyed over a roller to the next step, drying (170) for about 4-5 hours. Typically, a continuous oven dryer is used, though any similar equipment used in food processing will suffice.

As shown in FIG. 1, the extrudate is then dried in an oven (170) between 130-250° F., for 4-8 hours, depending on the dimensions of the strips, initial product moisture, etc. The higher the temperature, the shorter the drying time required. The temperature and drying profiles are important to prevent the generation of skin or excessive dehydration or shriveling of the product. After drying, the jerky is cooled (175) for 1-4 hours, typically at ambient temperature, before continuing to the next step of the process: random sizing (180). The drying and cooling process conditions and parameters also contribute to the final texture and roughness of the finished product.

Random sizing as referred to herein is the process of making smaller pieces from the extrudate strips (e.g., 210B) in such a way that each piece made generally appears to be different in terms of thickness, shape, size and/or texture from subsequently or previously produced pieces. This creates, in the aggregate, pieces of varying thickness, size, shape and/or texture that simulate an overall collection of haphazard, unsystematic or non-uniform collection of pieces that appear to have no governing design or method. The goal is to simulate the natural, wrinkled, rugged and non-uniform appearance of human grade jerky products but, as one skilled in the art will appreciate, this goal can rarely be completely realized, and a reasonable amount of variation is sufficient in actual practice. To emphasize, random sizing is not intended to mean that a particular piece is always designed to be different in dimension, shape or texture from another piece, or that there will not be two or more identically (or even similarly) shaped or sized pieces that could be found in a collection of pieces that are produced in any process run. FIGS. 11A and 11B are a further illustration of type of irregular and arbitrary product sizes and shapes that can be achieved through an illustrative embodiment of the present invention.

Figure 3:
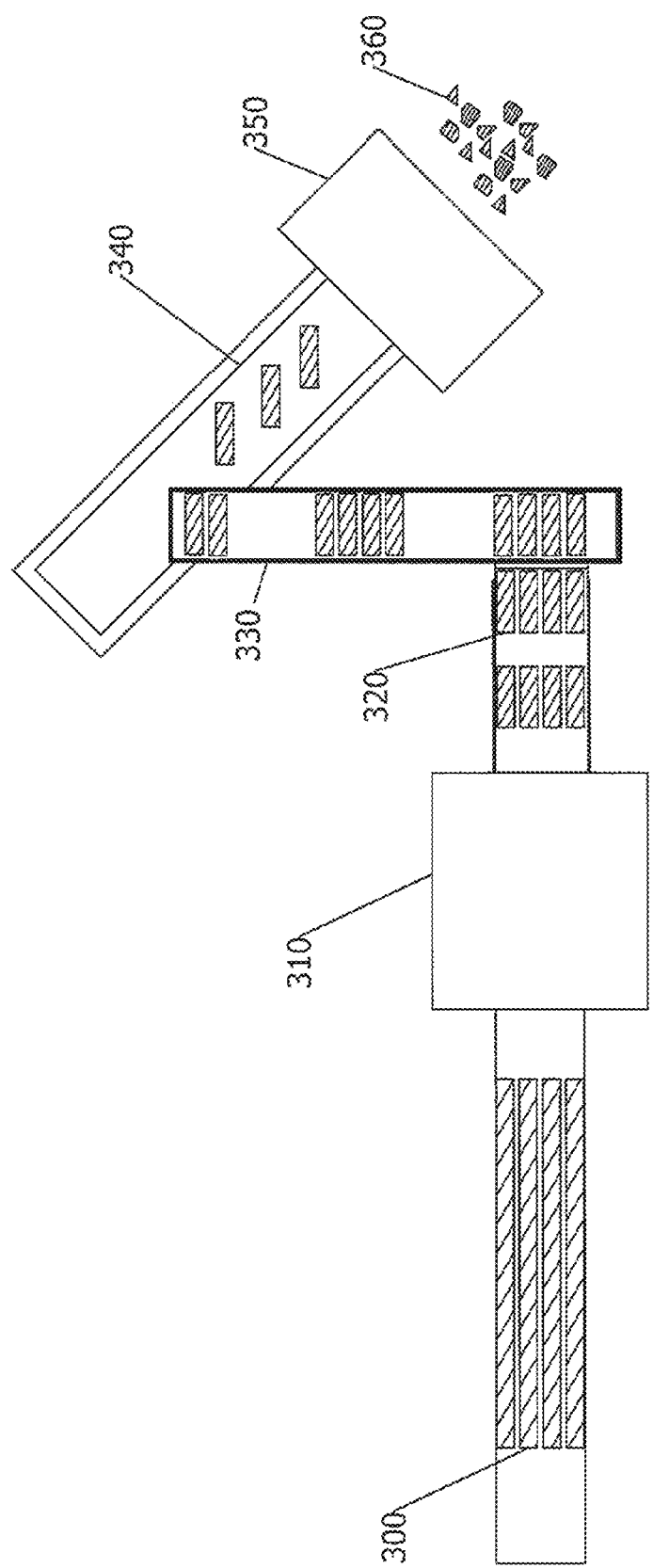
FIG. 3 is a more detailed overview of the random sizing step 180 of the process in FIG. 1, according to an illustrative embodiment of the invention.

FIG. 3 shows one illustrative embodiment of the random sizing process where jerky treats of variable thicknesses, textures, shapes and sizes, with jagged, rough, ripped, or shredded product edges are made. To assist in the description of this process, it is helpful to first discuss conventional approaches to cutting systems.

In conventional continuous cutting systems, cross-cutting and dicing are processes in which the cutting elements are horizontal or perpendicular to the direction of the motion of the product, which results in products that are typically uniform in shape. When cross-cutting processes are used, the product is typically cut by a blade or series of blades whose cutting edge is parallel to their rotational axis. The cutting circle of a crosscut blade is the circular path that the cutting edge of the blade travels while rotating about an axis. The size of the cut depends on the portion of product that crosses into the cutting circle when it comes into contact with the blade. Since cross-cuts are typically carried out with straight edge blades, it results in clean, uniform product edges.

Unlike the conventional method discussed in the preceding paragraph, FIG. 3 overviews a three-step process, consisting of a first cutting operation, followed by a change of product flow orientation, followed by a second cutting operation.

Figure 10:
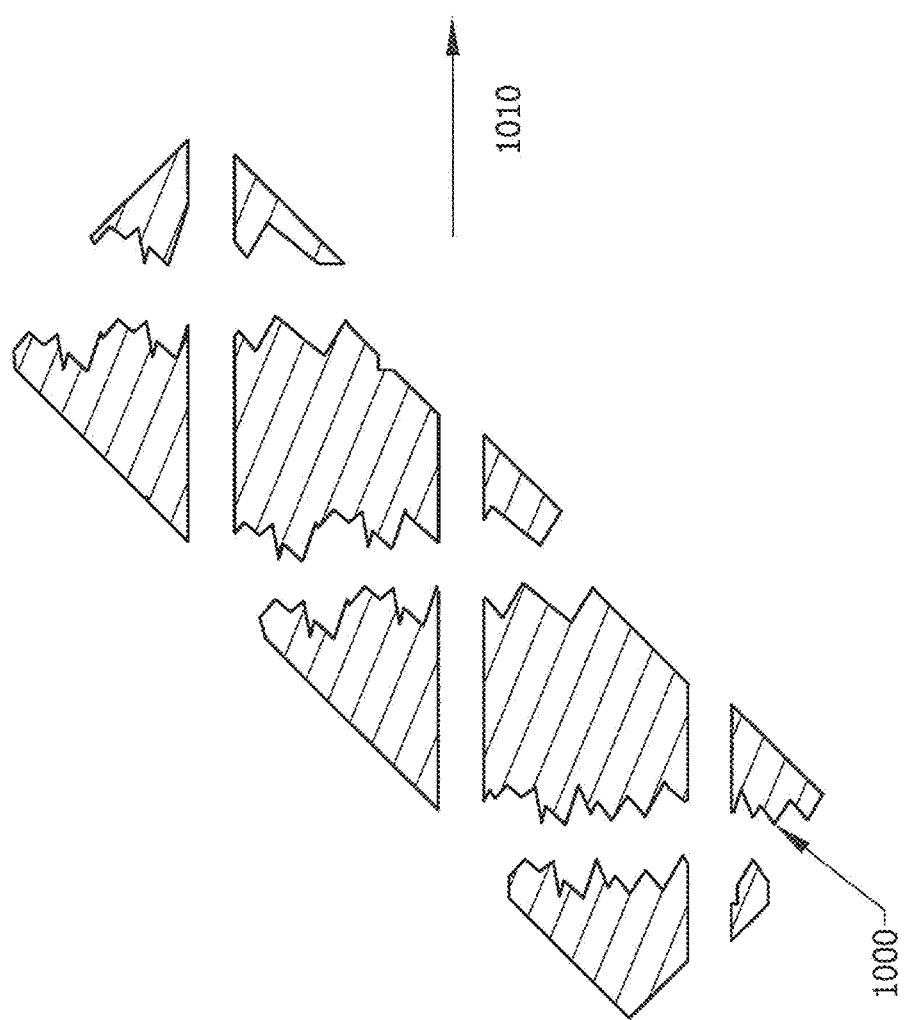
FIG. 10 shows a final jerky product pieces that have jagged or pulled edges, according to an illustrative embodiment of the invention.

In the first step, dried and cooled jerky strips are fed through the first conveyor (300) to a first cutter/shredder (310) to obtain 6-8" long strips (320). Typically, the cutter/shredder used in this first cutting operation has a single mounted blade with a single cut surface. However, more complex cutters/shredders, with serrated or notched crosscut blades and holding spurs, can also be used in this step to increase the roughness and texture. The crosscut blade is notched to allow the blade to act as a set of teeth that dig into the product without completely separating the cutting section from the product main body. The main body is held in place by a device which may include holding spurs, roller(s), an overhead conveyor, etc. while the rotation of the notched crosscut blade pulls the cut section away from the main body. In the absence of the holding device, an additional process may be implemented to separate the product from the main body including but not limited to manual separation. The result is a non-linear/ripped product edge as shown in FIG. 10 or FIG. 11A.

In the second step, the 6-8" strips (320) are then transferred to an aligning conveyor (330). This conveyor switches the orientation of the strips and aligns the strips for being cut in a different orientation during the third step. The aligning conveyor also spaces the strips before placing it on the in-feed conveyor (340), which then feeds the strips to the next cutter/shredder (350) in an oblique orientation. The longitudinal axis of the strips can be oriented anywhere between 1 and 89° with respect to the direction of travel on the in-feed conveyor (340) for the next cutter/shredder (350), and is more typically between 30 and 60°.

The third step (340, 350, 360), involves another cutting/shredding operation (350), that uses a set of serrated or notched cutting blades or a single blade that makes multiple cuts along the same cutting circle. The random sizing process with these unique cross cut and shredding systems results in a variety of irregularly shaped pieces—similar to triangles, quadrilaterals, and other regular or irregular polygons—continuously being made in a production line so that each product that comes out is generally of a different size and shape than the previous one, which eventually results in a plurality of product pieces that are of substantially random shapes, sizes and texture.

Figure 4C:
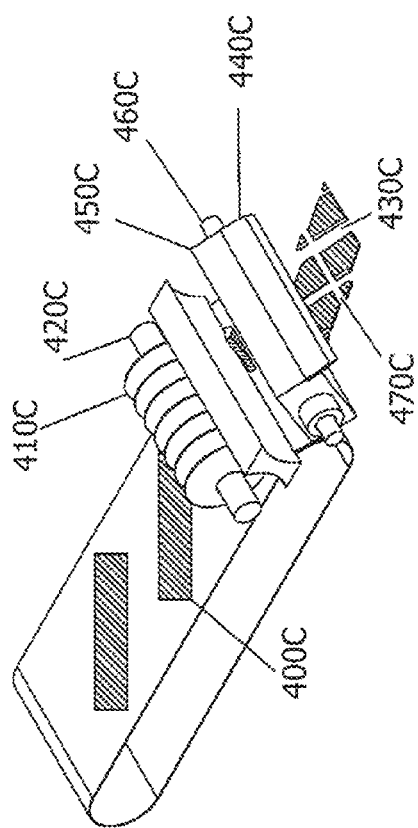
FIGS. 4A, 4B and 4C show details of the cutting/shredding process of FIG. 3, according to an illustrative embodiment of the invention.
Figure 4A:
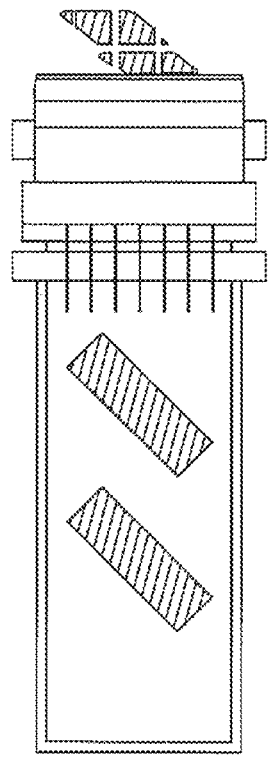
Figure 4B:
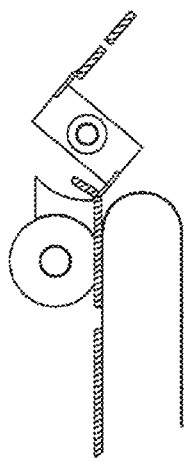

One illustrative embodiment of the second cutter/shredder operation (340-350) is illustrated in greater detail in FIG. 4A-C, and in FIG. 5A-B. This operation further changes the overall shape characteristics of the jerky. The cutter/shredder (350) has either a blade or blade assembly that will cut the interim product strips at two different times along the same cutting circle, and it cuts using both rotary and crosscut blades. The blade or blade assembly is the arrangement of notched straight blades that will eventually result in the complete separation of the product cutting section from the main body through shearing. A stepped cutting also results from the product being fed into the cutting circle and cut at different times. The angle between the cutting edges with respect to the crosscut rotational axis determines the time that will elapse between the initial and final cuts. The result is a generally a non-linear product edge.

The rotary blades (410C), as shown mounted on the rotary blade shaft (420C), provide a unique cut (430C, 520A) along the direction of travel (500A). Meanwhile the crosscut blades (440C), as shown mounted on the crosscut spindle (450C), rotate about the crosscut shaft (460C) and provide a unique cut (470C, 530A) that is roughly perpendicular to the direction of travel. Due to the oblique orientation of the jerky strips (510A) relative to their direction of travel as they pass through the cutter (500A), the resulting product pieces emerge in forms that are similar to triangles, parallelograms, and other geometric and/or irregular shapes of varying sizes (FIG. 5B), such that when a number of edible pieces are sequentially produced and collected, the product distribution in terms of shape, thickness, size and texture, appear substantially random and irregular (see FIG. 10, 11A and 11B).

Figure 6B:
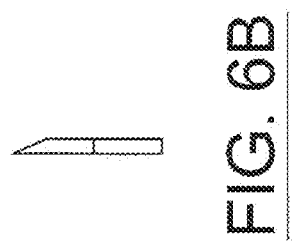
FIGS. 6A, 6B and 6C shows different views of the notched cross cut blade used in the cutting/shredding process (350) of FIG. 3, according to an illustrative embodiment of the invention.
Figure 6A:
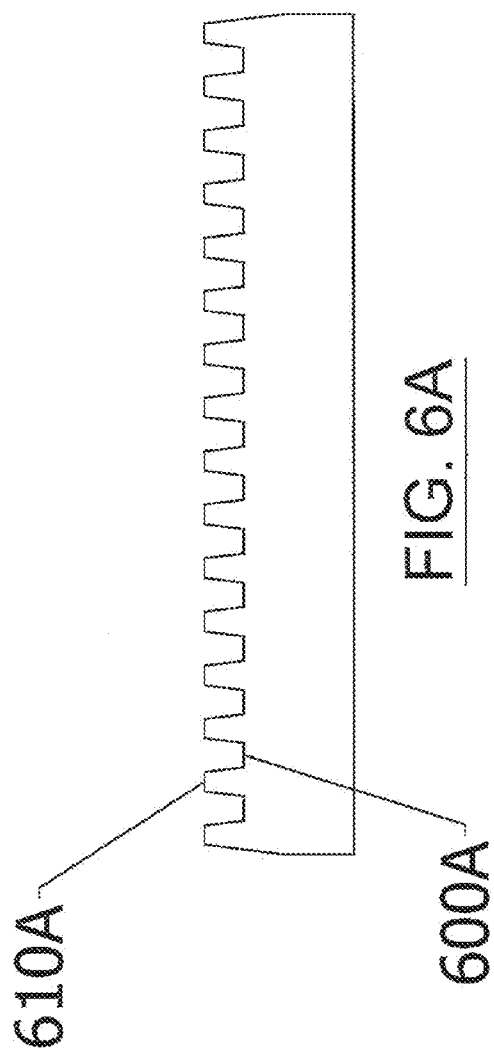
Figure 6C:
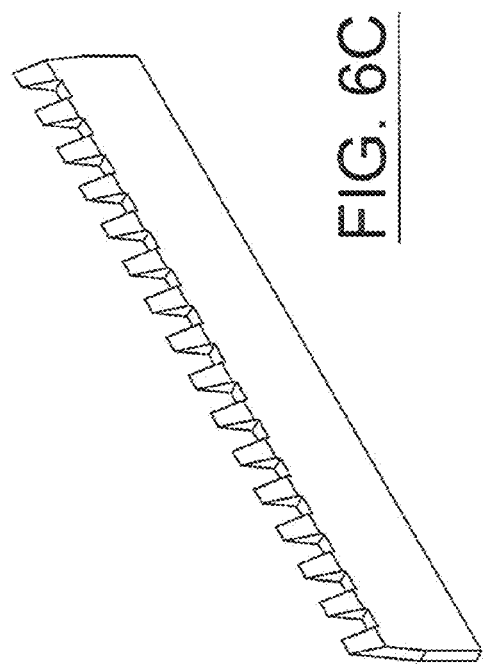
Figure 7C:
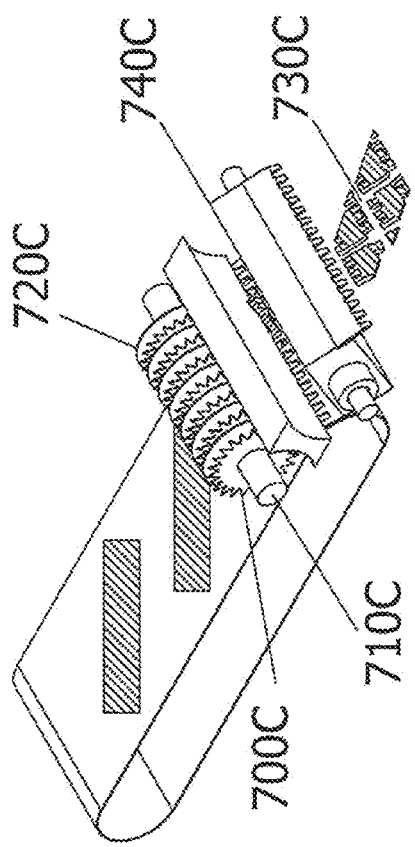
FIGS. 7A, 7B and 7C show different views of the cutting/shredding process (350) using notched crosscut blades and star shaped blades, according to an illustrative embodiment of the invention.
Figure 7B:
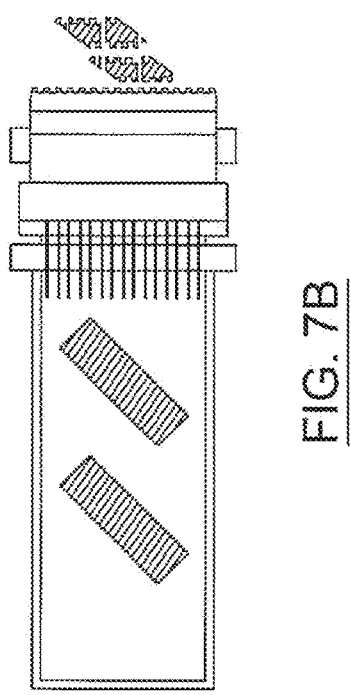
Figure 7A:
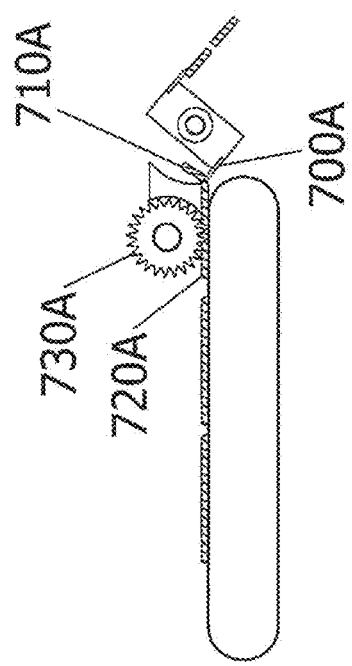
Figure 9:
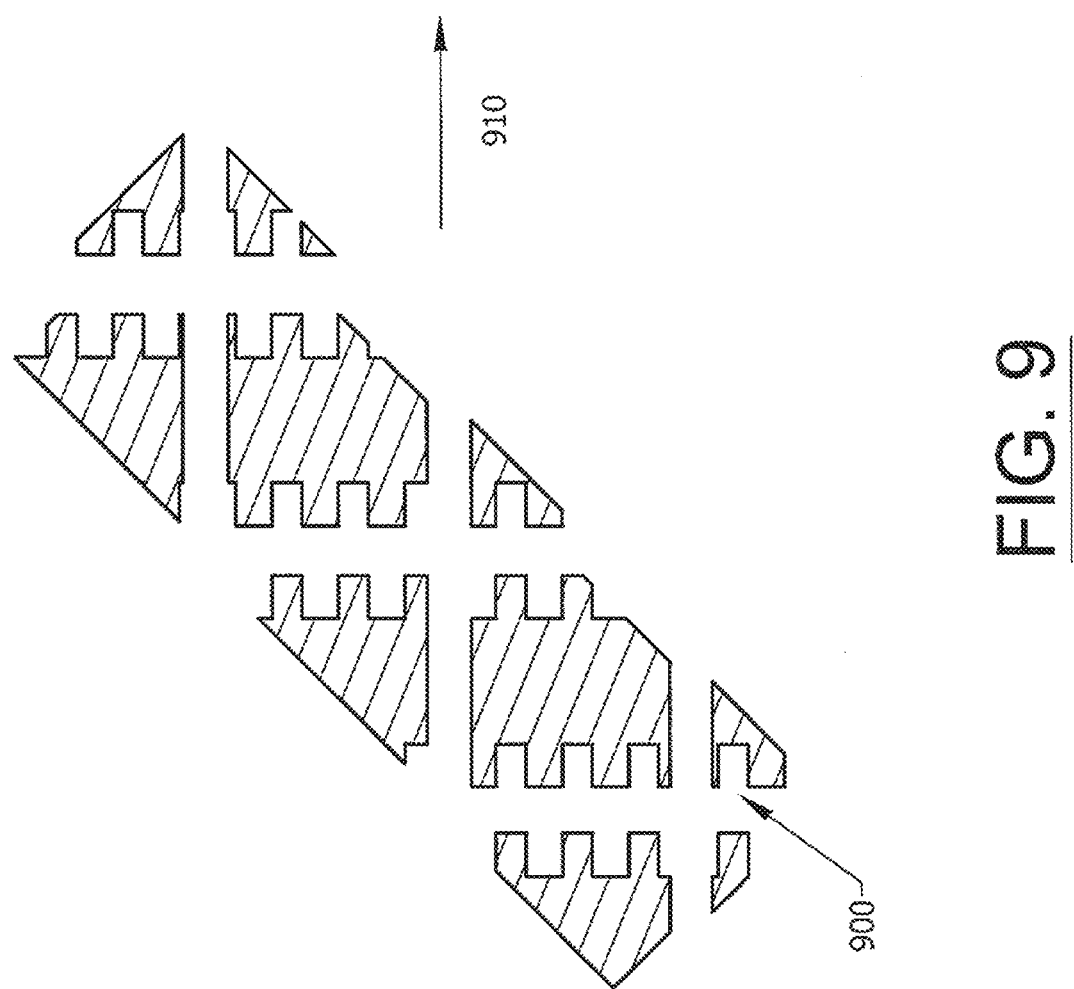
FIG. 9 shows possible shaping patterns for final jerky product pieces after a combination of notched and dual reduction cutting processes, according to an illustrative embodiment of the invention.

In the prior embodiment, the crosscut blades (440C) produce only a straight cut. The straight edge provides a clean and even cut along the product edge. In one embodiment of the subject invention, to give the beef jerky edges an even more natural and torn appearance and texture, the crosscut blades are notched (FIG. 6A) to obtain an uneven cut (730C). In the absence of a continuous cutting surface, the remaining edges of the crosscut blade (610A) penetrate the product like teeth. The motion of the notched crosscut blade (FIGS. 6C and 700A) pulls/tears the lead section of the product (710A), away from the product remainder (720A) which is held in place by the sharp edges of star shaped blades (730A), and this is also illustrated in FIG. 8A. While this is not necessary, to simplify the assembly, the star shaped blades (700C) may be mounted on the same shaft (710C) as the rotary blades (720C). In the event that the notched crosscut blade does not effectively cut the product, crosscut blades with two cutting surfaces (as shown in FIG. 8B mounted on the crosscut spindle) may be used to ensure a thorough cut. The additional cutting surface (800A, 800B) must generally follow the same cutting circle (810B) as the primary cutting surface (810A, 820B), to provide a staggered clean cut along the product edge. The result, of either the notched crosscut blades (FIG. 6B) or the dual cutting surface blades (FIG. 8B), is a jerky product with uneven, torn edges that appear to be pulled apart by hand (FIG. 9 and FIG. 10). After the random sizing operation described above, the product is then packaged in any of the typical methods and processes used in the pet industry (185).

While the foregoing description explains the manufacturing process used to make the product, it is also important to note that the type and relative proportions of ingredients used in making the product can also play a role in making variable thickness, irregularly shaped pieces, as will be evident to one skilled in the art. In particular, the increased proportion of meat used in this process helps develop a rough texture that appears more like human grade beef jerky that is made from sliced muscle meat.

Two recipes (A and B) are shown below to demonstrate some typical proportions of proteins and other ingredients used in the beginning of the process (FIG. 1 at mixer 130) to make a jerky treat for animal consumption (numbers below are in weight percent):

| Component | Recipe A | Recipe B |
|---|---|---|
| Meat/Animal Protein | 60% | 65% |
| Plant Protein | 5% | 3% |
| Starches | 20% | 10% |
| Flavors | 14% | 20% |
| Preservatives | 1% | 2% |
| TOTAL | 100% | 100% |

While the recipes above are specific, TABLE 1 below illustrates the broader ranges of composition of the key components that can be used in conjunction with the process described herein to make proteinaceous jerky treats for animal consumption. Some of these combinations would also be useful for making long-lasting products for human consumption, as will be appreciated by one skilled in the art. Note that many of these starting ingredients (e.g., beef or chicken or vegetables) inherently contain water.

TABLE 1

| Category | Typical examples/comments | Proportion (wt %) |
|---|---|---|
| Proteins | Chicken, beef, pork, turkey, venison, duck, etc., or a combination. Premium and lower grade meats, or offal, could also be used. Meat analogs such as soy or vegetable protein can also be used for developing more healthy snacks. | 40-95% |
| Flours/Starch/Carbohydrates | Wheat, soy, corn, tapioca, etc., or a combination | 0-20% |
| Vegetables/Fruits | Apples, banana, sweet potato, cranberry, carrots, peas, etc., or a combination | 0-10% |
| Flavor enhancers | Sugar, salt, garlic, onion, digests. | 5-20% |
| Preservatives | Potassium sorbate, sorbic acid, butylated hydroxyanisole (BHA), butylated hydroxytoluene (BHT), mixed tocopherols, calcium propionate, zinc propionate, rosemary extract, citric acid, sodium erythobate, | 0.01-5% |

Accelerated testing studies have also indicated that recipes A and B produce pet products that are shelf stable for at least 18 months, maintaining a stabilized intermediate moisture content (15-30% by weight, usually 18-26%), and stabilized water activity (Aw ranging from 0.60 to 0.78, usually 0.65-0.75%) without refrigeration under normal conditions of storage in homes or stores that are reasonable and expected for the packaged pet foods industry. The ingredient mix, within the composition ranges in TABLE 1 provided above, can also be adjusted as needed by one skilled in the art to ensure that similar stabilized moisture content and water activity is achieved to create final packaged products that are semi-most and shelf-stable for at least 18 months.

It will be apparent to one skilled in the art that the final shape and texture of the end products, and their size and thickness distributions, can be pre-designed and/or manipulated on-the-fly during the manufacturing process by pre-selecting and/or dynamically adjusting various process variables. These variables include, but are not limited to, the following:

1. Product orientation with respect to the cutting elements in either of the two cutting operations. FIG. 3. indicates a roughly perpendicular orientation between the first conveyor alignment (300 to 320) and the first cutter/dicer (310) (hereafter "Angle 1"), and between the final conveyor alignment (340 to 360) and the second cutter/dicer (350) (hereafter "Angle 2"). In alternative embodiments, Angle 1 and/or Angle 2 can be made oblique, in practice typically between 30 and 150°. Further, Angle 1 can be the same or completely different from Angle 2.

2. Conveyor flow orientation between first and second cutting operations. In FIG. 3, the angle between flow in the first cutting operation and the intermediate conveyor (330) (hereafter "Angle 3"), is roughly 90°; the angle between the intermediate conveyor and the second cutting operation (340, 350, 360) (hereafter "Angle 4"), is roughly 45°. In alternative embodiments, Angle 3 and Angle 4 can be varied between 20 and 70°, and is preferably between 35 and 55°.

Figure 2A:
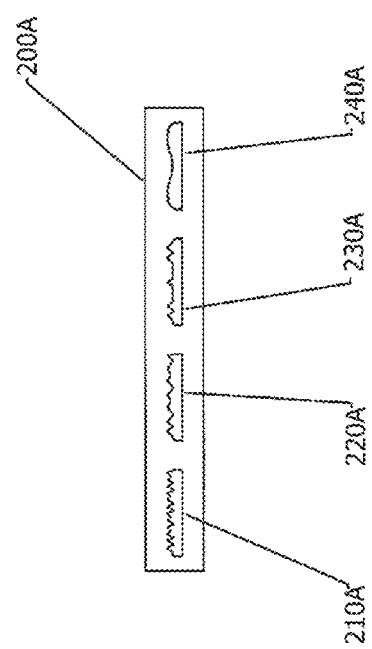

3. Pattern, size and shape of extrusion slots. In FIG. 2A, the extrusion slots are generally of the same length, but of different patterns. This can be changed in a wide variety of ways, with the length of each slot being different from each other to more variation in the width of the slots. The design is of course dependent on the end-user and market preferences; for instance, the small dog segment may require smaller, more uniform slits, whereas larger variations are possible for large dogs.

4. Width of the conveyor belt and size of the cutter/shredder. If a wider belt or a larger cutter/shredder were utilized, then the jerky strips could be a longer length, but these dimensions can be adjusted as needed based on the size of the pet the product is designed for, and other consumer and market preferences. Also there is a wide variety of the types of blades that can be used in the cutter/shredder.

5. Speed of the conveyor belt and/or cutting frequency/speed of the blade(s) in the cutting operation. Changing the speed of the conveyor belt allows dynamic control and variation in the size and texture of the product. For example, slower (faster) speeds in conveyor (300-320) will result in smaller (larger) pieces being produced, for the same cutting frequency of the blades. The speeds can also be varied differently in different conveyors and/or blades.

6. Variations in composition within the ranges prescribed in Table 1. For instance, increasing the meat concentrations and lowering or eliminating carbohydrates will increase the leathery, wrinkled texture of the product. Note that increasing the ratio of premium muscle meat to lower grade meat (including offal), will also increase the natural wholesome look, but this must be balanced with commercial considerations such as cost and consumer preferences. To some extent, the composition can also be adjusted dynamically during processing by adding multiple feed points, each independently controllable, instead of the fixed ingredients addition shown as (120) in FIG. 1.

7. Further processing with additional alignment conveyors and cutting operations angles after the end second cutting operation (350), to get finer cuts and an increase in randomness and irregularity of the pieces. One skilled in the art can also envision the possibility of using just one cutter/shredder operation twice. In other words, the output of the cutting operation can be sent back through a recycling conveyor to the beginning of the cutting operation, at a different angle, so that the product is processed a second time through the same cutter. In principle, this can be extended to as many cutting and re-feeding operations as necessary, and limited only be the requirements of the end product and its cost.

8. Use of one or more (a) "cookie cutter" type stampers or irregular patterns and shapes, or (b) cutters/slicing blades, that stamp/slice down sequentially after the extrusion step (160) on to the conveyor belt carrying the extrudate strips, at angle that is not perpendicular to the longitudinal movement of the conveyor, such that the strips get cut out in irregular patter ns after one (or more cuts) from these stampers/cutters.

9. Adjusting the force and direction of the cuts in one or more of the cutter/shredder operations. The angular force of the cutting blades can be tuned to adjust the degree to which the product strips are roughly torn by the blade edges rather than more precisely cut in accordance with the blade contours. To achieve the desired level of tearing/shredding, the angular force of the blades must be tuned relative to the texture and overall consistency of the dried product strips.

10. Changing the feed orientation for the second cutting operation without the use of an alignment conveyor. For instance, referring to FIG. 3, any commercially available pick and place equipment may be used instead of alignment conveyor (330) to pick up, change the orientation of the strip(s), and place them back on the same conveyor (300-320) which will then directly feed into the second cutting operation (340-360). Another option is to have the output (320) feed into a constantly revolving/tumbling container that randomly shuffles the pieces as they exit back onto the same conveyor in random orientations before being fed into the next cutting/shredding operation.

While the invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the claims below.

What is claimed is:

1. A process for manufacturing pet jerky treats comprising:
grinding proteinaceous material,
mixing said proteinaceous material with preservatives and flavor enhancers to form a blend of foodstuff,
extruding said foodstuff through at least one die opening that is at least partially irregular to form at least one strip of extrudate that is at least partly irregular in shape,
transporting said strip in a first longitudinal direction to a first cutting operation,
cutting said strip at a first cutting angle to form a first set of pieces,
placing said first set of pieces in an oblique orientation along a second longitudinal direction;
transporting said first set of pieces in the second longitudinal direction to a second cutting operation, and
cutting said first set of pieces in said second cutting operation at a second angle to form a second set of pieces,
such that said second set of pieces cumulatively produced during a process run generally appear to be of random sizes and shapes, and appear to have notched, jagged, ripped or shredded edges.

2. The process of claim 1 wherein said at least one strip is transported by a conveyor.

3. The process of claim 1 wherein said first set of pieces are transported by a conveyor.

4. The process of claim 1 wherein said first cutting angle is substantially perpendicular to said first longitudinal direction.

5. The process of claim 1 wherein said second cutting angle is substantially perpendicular to said second longitudinal direction.

6. The process of claim 1 wherein said angle between said first longitudinal direction and said second longitudinal direction is between 30 and 60 degrees.

7. The process of claim 1 wherein at least one of said first or second cutting operations uses serrated blades.

8. The process of claim 1 wherein at least one of said first or second cutting operations uses rotary blades.

9. The process of claim 1 wherein said second cutting operation has a combination of rotary and serrated blades that pull and tear said first set of pieces.

10. The process of claim 1 wherein said at least one strip is continuously extruded along said first longitudinal direction to said first cutting operation.

11. The process of claim 1 wherein said at least one strip is cut from said extrudate into lengths before said first cutting operation.

12. The process of claim 1 comprising a further step of drying said at least one strip in an oven at a temperature in the range of about 130° F. to about 250° F. for about 4 to about 8 hours.

13. The process of claim 12 comprising a step of cooling said at least one strip at about ambient air temperature for about 1 to about 4 hours.

14. The process of claim 1 wherein at least one of said first or second cutting operations uses notched blades.

15. A process for manufacturing pet jerky treats comprising:
- extruding a ground proteinaceous mix through at least one die opening that is at least partially irregular to form at least one strip of extrudate that is at least partly irregular in shape,
- transporting said at least one strip placed in an initial orientation on a surface of a first conveyor moving in a first longitudinal direction to a cutting operation,
- cutting said at least one strip at a first cutting angle that is not parallel to said longitudinal direction to form a first set of pieces,
- transporting said first set of pieces back to said first conveyor and placing said first set of pieces spaced out from one another on said conveyor surface in an orientation that is oblique to said longitudinal direction, and
- cutting said first set of pieces again at said cutting operation to form a second set of pieces that are generally smaller than said first set of pieces,
- such that the said second set of pieces cumulatively produced during a process run generally appear to be of random sizes and shapes.

16. A process for manufacturing pet jerky treats comprising:
- extruding a ground proteinaceous mix through at least one die opening that is at least partially irregular to form at least one strip of extrudate that is at least partly irregular in shape,
- transporting said at least one strip placed in a first orientation on a surface of a first conveyor moving in a first longitudinal direction to a first cutting operation,
- cutting said strip at a first cutting angle that is generally not parallel to said first longitudinal direction to form a first set of pieces,
- changing flow orientation of said first set of pieces by placing them on a surface of a second conveyor in a second orientation that is oblique to a second longitudinal direction, wherein said second conveyor is moving in said second longitudinal direction to a second cutting operation,
- cutting said first set of pieces at said second cutting operation to form a second set of pieces that are generally smaller than said first set of pieces,
- such that the said second set of pieces cumulatively produced during a process run generally appear to be of random sizes and shapes, and appear to have notched, jagged, ripped or shredded edges.

17. A process for manufacturing pet jerky treats comprising:
- extruding a ground proteinaceous mix through at least one die opening that is at least partially irregular to form at least one strip of extrudate that is at least partly irregular in shape,
- transporting said at least one strip placed in a first orientation on a surface of a first conveyor moving in a first longitudinal direction to a first cutting operation,
- cutting said strip at a first cutting angle that is substantially perpendicular to said first longitudinal direction to form a first set of pieces,
- transporting said first set of pieces on an aligning conveyor to a second conveyor moving in a second longitudinal direction to a second cutting operation, wherein said first set of pieces are placed in an oblique orientation on said second conveyor;
- transporting said first set of pieces on said second conveyor to said second cutting operation; and
- cutting said first set of pieces at said second cutting operation that is substantially perpendicular to said second longitudinal direction to form a second set of pieces that are generally smaller than said first set of pieces, wherein said second set of pieces cumulatively produced during a process run generally appear to be irregularly shaped with various sizes and appear to have notched, jagged, ripped or shredded edges.

* * * * *